March 8, 1966   R. H. CHAMPION   3,238,969
BY-PASS GAS METER BAR AND KEY ACTUATOR THEREFOR
Filed Jan. 10, 1964   3 Sheets-Sheet 1
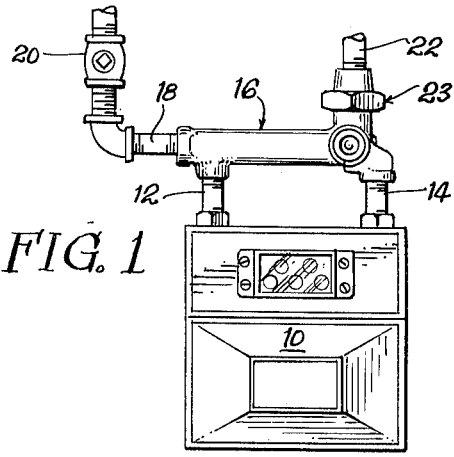
FIG. 1
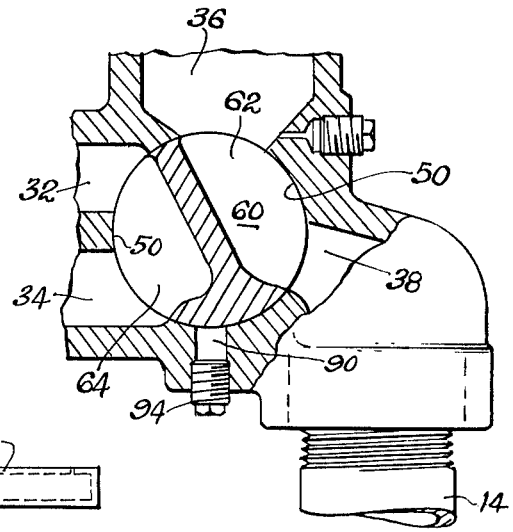
FIG. 3
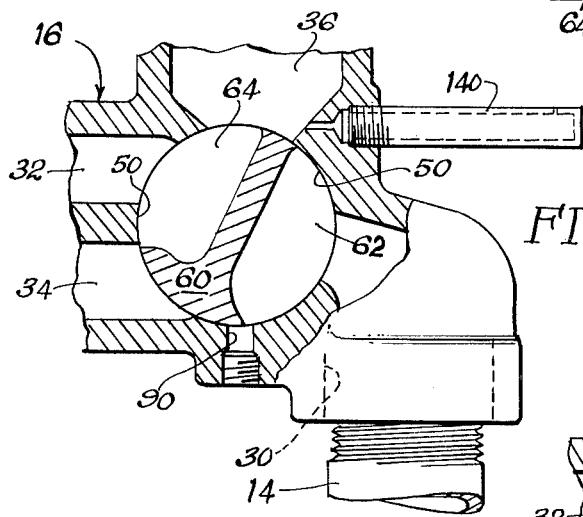
FIG. 4
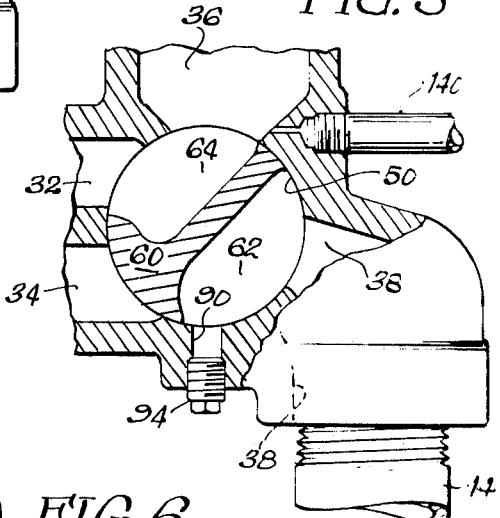
FIG. 5
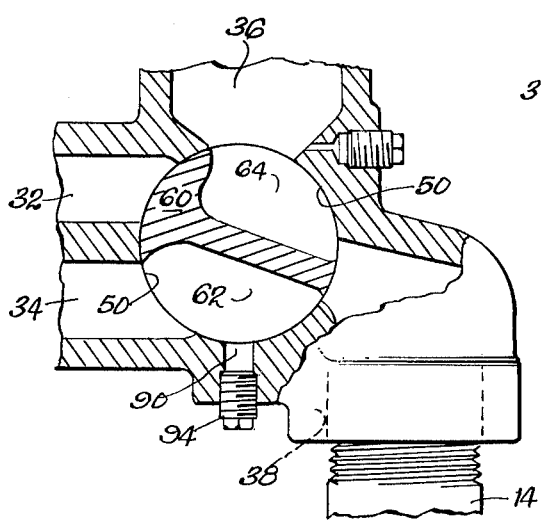
FIG. 6
INVENTOR.
Ronald H. Champion
BY
Atty

March 8, 1966 R. H. CHAMPION 3,238,969
BY-PASS GAS METER BAR AND KEY ACTUATOR THEREFOR
Filed Jan. 10, 1964 3 Sheets-Sheet 2
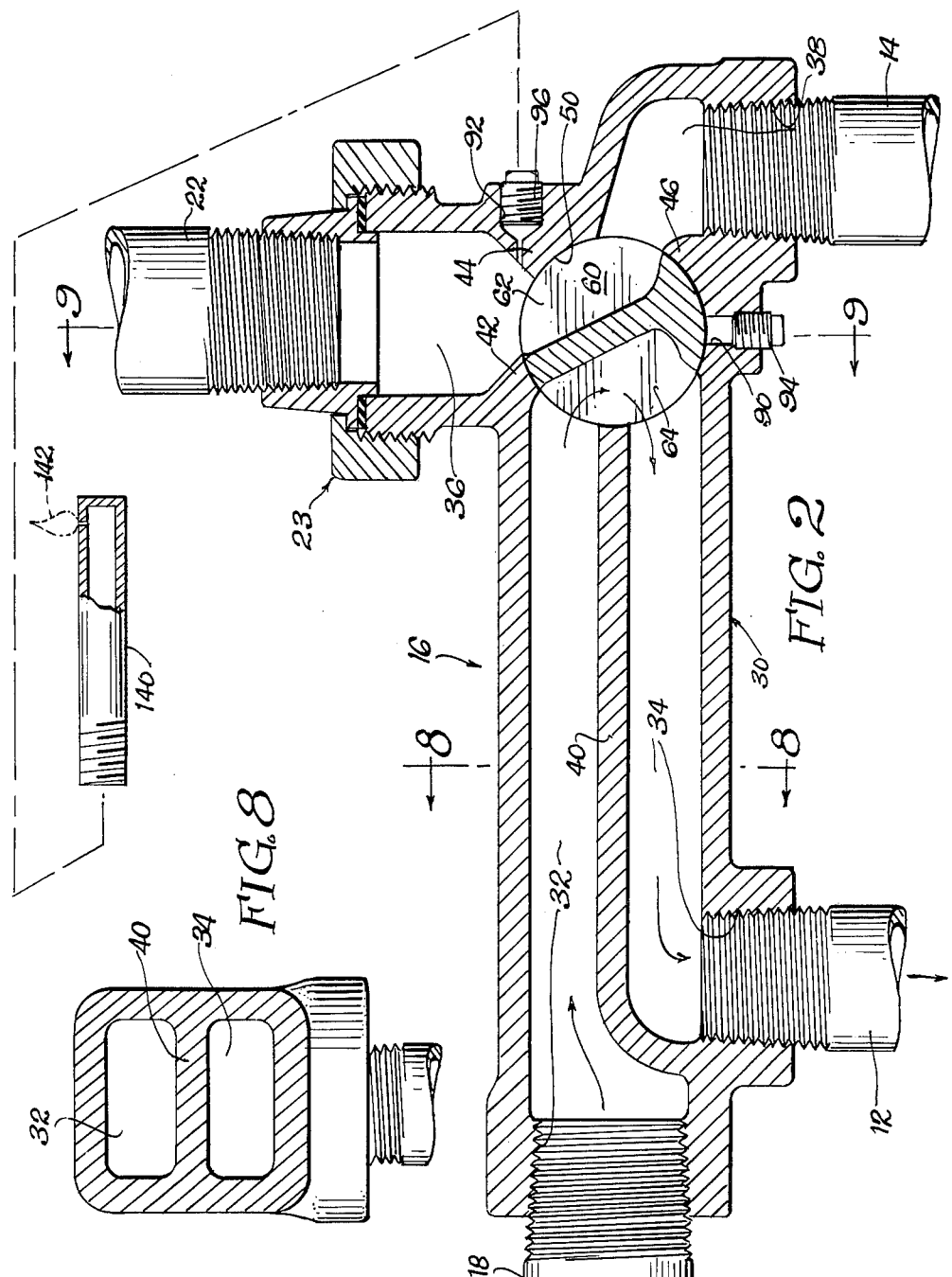
INVENTOR
Ronald H. Champion
BY
Atty

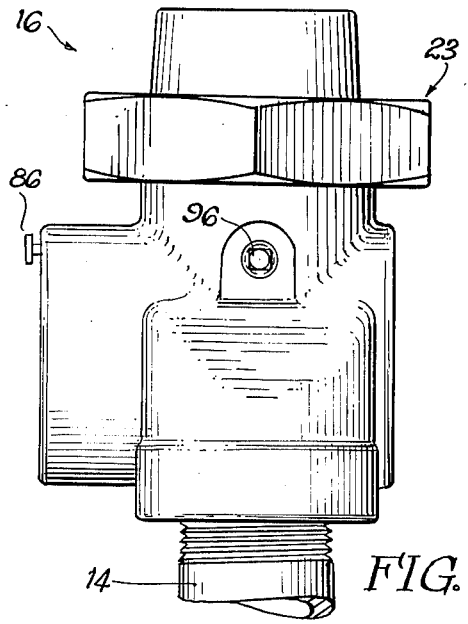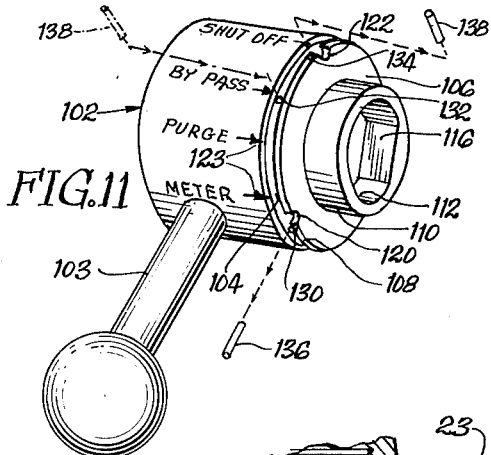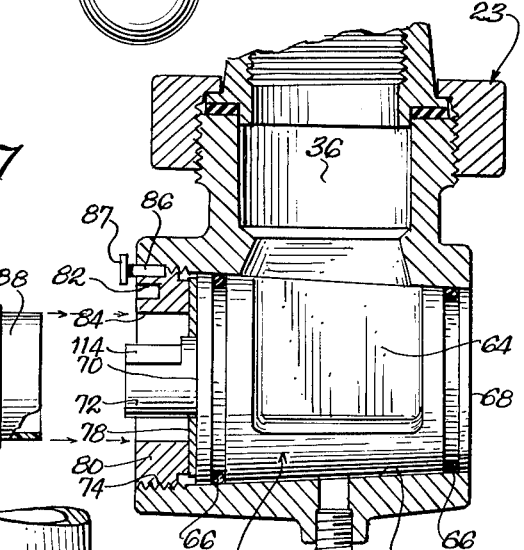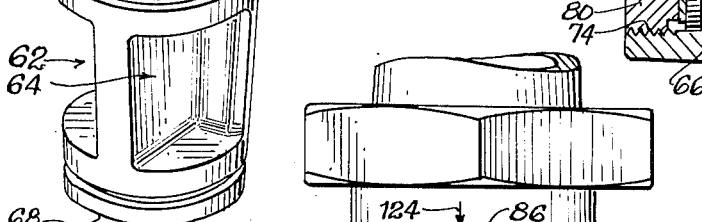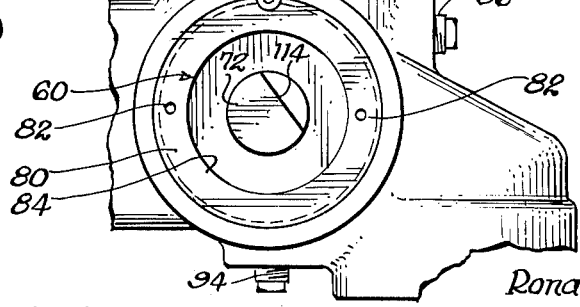

United States Patent Office 3,238,969
Patented Mar. 8, 1966

3,238,969
BY-PASS GAS METER BAR AND KEY ACTUATOR THEREFOR
Ronald H. Champion, Rockford, Ill., assignor to Eclipse Fuel Engineering Co., Rockford, Ill., a corporation of Illinois
Filed Jan. 10, 1964, Ser. No. 337,008
12 Claims. (Cl. 137—599.1)

The present invention relates to gas meter bars and has particular reference to a novel combination of a gas meter bar and by-pass arrangement whereby meter change-over operations may be effected without interruption to service.

There are at the present time on the market a class of gas meter bars which make provision for gas meter substitution or replacement without necessitaing interruption of gas supply service. Such meter bars replace the conventional horizontally disposed solid meter bars which are connected to the gas supply and service pipes which lead from the gas mains and to the household outlets respectively. Such meter bars have incorporated therewith by-pass means in the form of valves which, when in their normal inoperative positions, establish a flow of gas from the gas mains through the associated meters to the service pipes, and when in their inoperative positions, establish a flow of gas from the gas mains directly to the service pipes, thus by-passing the meters and cutting off the flow of gas to the meters so that meter removal and replacement operations may be effected without escape of gas other than a small amount of residual gas from the meters. Such by-pass gas meter bars are predicted upon the fact that from time to time, either as specified by law or as dictated by the policy of recalibrating gas meters at intervals of from two to three years, meter substitution is resorted to both in household and commercial practice.

By pass gas meter bars as heretofore constructed are possessed of numerous limitations, one limitation being that they fail to make adequate provision for purging newly-installed meters of air after the meters have been installed. Unless a meter is purged of all air before it is operatively connected in the household gas system, the pilot flames of such appliances as kitchen ranges, water heaters, and the like, or main sustaining flame of gas refrigerators, will become extinguished and thus nullify the orinigal intent of the by-pass arrangement. To purge a meter, it has heretofore been the practice to provide a separate purge plug, either in the by-pass meter bar or in a pipe section leading from the outlet side of the meter. Removal or, at least, partial unthreading of the purge plug is resorted to until the odor of gas is detected, after which the plug is replaced or tightened. This separate purge operation is inconvenient and requires special tools.

Another limitation that is attendant upon present-day by-pass gas meter bars resides in the use of plural built-in valves. The use of plural valves obviously materially increases the cost of the meter bars and, furthermore, it entails sequential valve manipulation in accordance with a predetermined schedule or pattern of operation which must be outlined for the service personnel, It also affords plural chances for improper valve operation through inadvertence, as well as plural chances for improper or illegal consumer gas conversion.

The present invention is designed to overcome the above-noted limitations that are attendant upon the construction and use of present-day by-pass gas meter bars and toward this end, the invention contemplates the provision of a novel by-pass meter bar which employs for its operation a single rotary valve, the valve being inherently incorporated in the meter bar and being capable of movement between four functional positions, namely, a first position wherein gas is supplied from the gas main to the household service pipe through the associated gas meter; a second position wherein gas is supplied from the gas main directly to the service pipe, thus by-passing the meter so that meter change-over operations may be resorted to without gas service interruption; a third position wherein a newly-installed meter may be purged of air; and a fourth or shut-off position wherein the flow of gas from the gas main to the service pipe is effectively blocked.

The provision of a by-pass gas meter bar of the character briefly outlined above being among the principal objects of the invention, a further object is to provide a by-pass meter bar which possesses novel tamper-proof characteristics that make it virtually impossible for consumer gas conversion.

Another object of the invention is to provide a by-pass gas meter bar embodying a single rotary four-position valve, together with novel actuating or operating means therefor, the operating means being peculiar to the service personnel to the exclusion of the consumer and being of such a character that it is fool-proof in its operation, requires no special skill for its manipulation, and is so constructed and designed that it cannot be inadvertently removed from a given installation unless the rotary valve of the meter bar is either in its normal gas metering position or its terminal shut-off position.

A still further object of the invention is to provide a by-pass gas meter bar which is of the aforementioned character and embodies means whereby purge operations may be more conveniently accomplished than has heretofore been possible with previously designed by-pass gas meter bars of the same general character.

With these and other objects in view, which will become more readily apparent as the nature of the invention is better understood, the invention consists of the novel construction, combination and arrangement of parts shown in the accompanying three sheets of drawings forming a part of this specification:

In these drawings:

FIG. 1 is a front elevational view of a gas meter installation including a by-pass meter bar embodying the principles of the present invention;

FIG. 2 is a sectional view taken centrally and longitudinally through the by-pass meter bar and showing the single rotary valve in its normal gas metering position;

FIG. 3 is a fragmentary sectional view taken through the meter bar in the vicinity of the valve and showing the latter in its normal gas metering position;

FIG. 4 is a fragmentary sectional view similar to FIG. 3 but showing the valve in its purge position;

FIG. 5 is a fragmentary sectional view similar to FIG. 3 but showing the valve in its by-pass position;

FIG. 6 is a fragmentary sectional view similar to FIG. 3 but showing the valve in its shut-off position;

FIG. 7 is an end elevational view of the meter bar;

FIG. 8 is a transverse sectional view taken on the line 8—8 of FIG. 2.

FIG. 9 is a transverse sectional view taken substantially along the line 9—9 of FIG. 2;

FIG. 10 is a perspective view of the single rotary four-position valve plug of the improved meter bar;

FIG. 11 is a perspective view of the operating key which is used or employed for turning the valve plug of the meter bar to its various position; and FIG. 12 is a fragmentary side view of the meter bar.

Referring now to the drawings in detail and in particular to FIG. 1 wherein a gas meter installation embodying the by-pass gas meter bar of the present invention has been illustrated, a conventional gas meter 10 having a gas inlet connection 12 and a gas outlet connection 14 is suspended by way of the improved meter bar, such bar being identified by the reference numeral 16. The meter inlet connection 12 normally communicates through the meter bar 16 with the associated gas main by way of a supply pipe 18 having a conventional shut-off cock 20 interposed therein. The meter outlet connection 14 normally communicates through the meter bar 16 with a gas service pipe 22 by means of a suitable fitting 23.

Referring now to FIGS. 2 and 6, inclusive, the by-pass gas meter bar 16 of the present invention is in the form of an assembly of parts including a hollow casting 30 of horizontally elongated design. The external configuration of such casting is somewhat similar to the external configuration of a conventional and universally used solid meter bar. The meter bar casting 30 is provided with an axial female gas supply inlet opening 32 and a depending or downwardly facing female gas outlet opening 34. The latter leads to the meter 10 through the inlet connection 12. The inlet opening 32 and the outlet opening 34 are disposed adjacent to one end of the meter bar casting. Adjacent to the other end of the meter bar casting, there are provided an upwardly facing male gas outlet opening 36 leading to the gas service pipe 22, and a depending or downwardly facing female gas inlet opening 38 in communication with the meter through the gas outlet connection 14.

The inlet opening 32 and the outlet opening 34 are separated from each other by an elongated horizontally extending internal partition forming web 40. The inlet opening 32 and the outlet opening 36 are separated by a short internal partition forming web 42. The outlet opening 36 and the inlet opening 38 are separated by a short internal partition forming web 44. The inlet opening 38 and the outlet opening 34 are separated by a short partition forming web 46. The long horizontally extending web 40 and the three short webs 42, 44 and 46 converge in radial fashion adjacent to the right-hand end of the meter bar casting as viewed in FIG. 2, each web terminating at the circumference of a generally cylindrical but slightly tapered open-ended valve chamber 50. The chamber 50 extends transversely and horizontally through the casting 30 and is plurally designated in the various views for sake of clarity of definition. It tapers from front to rear and, therefore, is of generally frusto-conical configuration. As shown in the drawings, the chamber 50 has a relatively small slant angle and a short slant height commensurate with the fuel width of the meter bar.

Rotatable within the valve chamber 50 is a valve plug 60 which is shown in detail in FIG. 10 and is generally in the form of a tapered cylindrical body or spool having formed therein two pocket-like depressions or relief areas 62 and 64, these areas constituting, in effect, valve passages in the valve plug. The end regions of the valve plug 60 are sealed to the opposite end regions of the valve chamber by elastomeric O-rings 66 (see also FIG. 9). The rear circular end face 68 of the valve plug 60 is exposed at the small base region of the frusto-conical chamber. The front end face 70 of the valve plug is formed with an integral non-circular key-receiving protuberance 72.

As best seen in FIG. 9, the front end or large base region of the frusto-conical valve chamber 50 is internally threaded as at 74. The key-receiving protuberance 72 projects axially into this threaded area and is surrounded by a thrust washer 78 which is held in place by a threaded retaining ring 80. The latter has formed therein spanner holes 82 whereby it may be screwed in position within the counterbore 74 by way of any suitable turning tool (not shown). The ring 80 is provided with a central opening 84 through which the key-receiving protuberance 72 is accessible for turning movement thereof and for consequent rotation of the valve plug 60. A key-retaining pin 86 with an enlarged head 87 projects forwardly from the front face of the meter bar casting at the peripheral region of the valve chamber 60 and serves a purpose that will be made clear presently. A removable cap 88 is provided for the purpose of sealing the central opening 84.

In addition to the inlet openings 32 and 38 and the outlet openings 34 and 36, the casting 30 is provided with a small purge opening 90 (FIGS. 2 to 6, inclusive) and a similar test opening 92, the function of which will appear presently. The purge opening is in the form of a tapped hole which is drilled radially through the web 46, while the test opening is in the form of a tapped hole which is drilled through the wall of the meter bar casting at a suitable point where it communicates with the male gas outlet 36. These two openings are normally closed or sealed by respective threaded plugs 94 and 96.

Still referring to FIGS. 2 to 6, inclusive, the valve plug 60 is movable between four functional positions including a first position wherein the relief area or valve passage 64 establishes communication between the gas supply inlet opening 32 and the outlet 34, while at the same time, the relief area or valve passage 62 establishes communication between the gas inlet opening 38 and the male gas outlet opening 36. This position of the valve plug 60 may be referred to as the meter position inasmuch as when it occurs or obtains, gas may flow from the gas main through the supply pipe 18, the gas supply inlet opening 32, the outlet opening 34, the meter 10, the inlet opening 38 and the outlet opening 36 to the service pipe 22. This position of the valve plug is illustrated in FIGS. 2 and 3.

The valve plug 60 is capable of assuming a second position as shown in FIG. 4 wherein a small amount of gas is permitted to bleed through the valve passage 64 and pass from the inlet opening 32 to the outlet opening 34, while at the same time, the inlet opening 38 and the outlet opening 36 are out of communication with each other, but the inlet opening 38 is in communication with the purge opening 90. This position of the valve plug 60 is referred to herein as the purge position inasmuch as a small amount of gas is allowed to flow from the inlet 32, through the outlet opening 34, and from thence through the meter 10, after which it enters the meter bar through the inlet opening 38 and leaves the meter bar through the purge opening 90, the plug 94 having been previously removed from the purge opening 90. Thus, a newly-installed meter 10 may be bled of residual air.

The valve plug 60 is capable of assuming a third position in which it is illustrated in FIG. 5. In such third position of the valve plug, communication is established by the valve passage 64 between the inlet opening 32 and the outlet opening 36, while at the same time the valve passage 62 blocks the flow of gas from the inlet opening 38 to the outlet opening 36. This position of the valve plug is referred to herein as the by-pass position inasmuch as the gas which enters the inlet opening 32 is permitted to flow directly to the service pipe 22 through the outlet opening 36 while the openings 34 and 38 are completely closed off so that actual meter change-over operations may be effected.

The fourth position which the valve plug is capable of assuming is illustrated in FIG. 6. This position is referred to herein as the shut-off position inasmuch as the gas inlet opening 32 is completely blocked off from both outlet openings. Although there may be communication between the inlet opening 38 and the outlet opening 36, this is without significance because gas service is effectively shut off and there will be no escape of gas regardless of whether the meter 10 is removed or allowed to remain in position on the meter bar 18.

Manipulation of the valve plug 60 is possible only under the control of a special actuating key such as has been illustrated in FIG. 11 and designated in its entirety by the reference numeral 100. This key is in the form of a cylindrical body 102 having a radial operating lever or handle 103. The forward end region of the body 102 is formed with a continuous annular groove 104 therearound, the groove and the adjacent end face 106 defining therebetween a circular retaining or locking flange 108.

A circular boss 110 on the end face 106 establishes a key socket 112 of non-circular cross section and conformable in shape to the cross-sectional shape of the key-receiving protuberance 72 on the front end face 70 of the valve plug 60. While various non-circular cross-sectional shapes for the protuberance 72 and the socket 112 may be employed conveniently, these mating parts may be of cylindrical design with flattened side portions 114 and 116, respectively. The key body 102 is designed for endwise projection through the opening 84 in the retaining ring 80 so that the key socket 112 may be telescopically received over the protuberance 72 for torque-transmitting purposes.

Means is provided for preventing withdrawal of the key 100 from operative engagement with the valve plug 60 except when the latter is in its normal meter position or its by-pass position. This means comprises the previously mentioned pin 86 (see FIGS. 9 and 12). Notches 120 and 122 are provided in the periphery of the circular retaining flange 108 at circumferentially spaced regions therearound, the notches being so positioned that they will clear the enlarged head 87 of the pin 86 when the key 100 is so oriented with respect to the valve plug that the plug its either in its meter or shut-off position, these and other positions of the key being indicated by suitably labelled indicia marks 123 on the surface of the key body 102 and a cooperating pointer 124 on the meter bar 16. After the flange 108 has entered behind the enlarged head 87 of the pin 86, and the key turned so that the pin is out of register with both notches 120 and 122, obviously the key may not be withdrawn from the meter bar since the enlarged head 87 of the pin 86 functions as a locking protuberance which will not release the retaining flange 108 except when the head 87 is in register with either the notch 120 or the notch 122.

As best seen in FIG. 11, the bottom of the annular groove 104 has drilled therein three circumferentially spaced holes 130, 132 and 134. These holes are designed for selective reception therein of two stop pins 136 and 138. The stop pins cooperate with the shank portion of the pin 86 in limiting the extent of turning movement of which the key is capable. The hole 130 is adapted permanently to receive the pin 136 therein, while the holes 132 and 134 may be selectively receive the pin 138, depending upon the particular range of circumferential movement desired for the operating key 100.

By way of explanation, it is pointed out that the meter bar 16 shall, without any modification whatsoever, be capable of two different types of operation, the particular type of operation being solely dependent upon the character of the operating key 100. In most instances, the fourth or shut-off position of the valve plug 30 will not be required and the shut-off cock 20 in the gas supply pipe 18 leading from the gas main may be relied upon for consumer shut-down operation. In such an instance, the stop pin 138 will be positioned in the hole 132 so that the range of angular turning movement of which the operating key is capable is limited to movement between the first, second and third positions of the valve plug 30. The pin 138 will thus prevent the key from being turned beyond the third position so that the fourth or shut-off position may not be assumed. However, in some limited instances, it may be desirable to effect a shut-off operation by means of the valve plug 60, as, for example, when a particular consumer is suspected of gas conversion or has been found guilty of gas conversion and the shut-off cock 20 is not considered sufficiently tamper-proof to discourage such conversion. In such an instance, the pin 138 will be positioned in the hole 134 and the hole 132 will remain devoid of a pin. The operating key 100 will then be capable of its full range of angular turning movement between the first and fourth positions of the valve plug 60.

In the operation of the herein described meter bar 16, when it is necessary to remove the meter 10 for purposes of replacement, repair, or for any other reason whatsoever, the service employee will first remove the cap 88 (see FIG. 9) and insert the key body 102 endwise through the opening 84 in the retaining ring 80, the key body entering the opening freely by reason of registry between the notch 120 and the pin 86. The valve plug and the key will, of course, be in the first or meter position thereof at this time. By manipulation of the handle 103, the operator will turn the key and valve plug to the third or by-pass position. In this third position of the valve plug 60, gas will flow directly from the gas main to the service pipe 22, as previously described, so that the meter 10 may be removed with impunity and no loss or escape of gas will occur except for a small amount of leakage of residual gas which may escape from the removed meter. The replacement meter may then be installed after which the operating key 100 will be manipulated to turn the valve plug back to its second or purge position, the plug 94 will be removed from the purge opening 90 either before or after turning of the valve plug 60 to its purge position. It is contemplated that purge operations will be allowed to take place until the service employee detects the odor of gas issuing from the purging opening 90, after which he will manipulate the operating key 100 and turn the valve plug 60 back to its original first position and withdraw the operating key, after first replacing the plug 94 in the purge opening 90.

The test opening 92 affords a means whereby the service employee may be provided with a visual check on the reliability of the by-pass operation of the meter bar 16 during meter change-over operations. Before turning the valve plug 60, the plug 96 may be removed from the test opening 92 and a pilot tube 140 attached to the opening, the tube emitting a small flame jet as indicated at 142 which is indicative of continuity of gas flow to the service pipe 22 during meter change-over operations. The pilot tube may be removed and the plug 96 replaced after normal gas service has been restored and the valve plug is returned to its initial meter position.

With the pin 138 in the hole 132 (see FIG. 11), the service employee may not turn the operating key and the valve plug 60 to the fourth or shut-off position of the valve plug and, as a consequence, the notch 120 may not be brought into register with the pin 86 (see FIG. 12). The operating key 100 is, therefore, incapable of being removed from the valve plug except when the notch 122 is in register with the pin 86 at the meter position of the valve plug.

If shut-off operations are made possible by placement of the pin 138 in the hole 134, then the notch 120 is capable of assuming a position of registry with the pin 86 when the valve plug is in its fourth or shut-off position and, at this time, the operating key 100 may be removed.

It is contemplated that the service employee shall carry with him two different operating keys, one key being conditioned for meter bar operation exclusive of the fourth shut-off position of the valve plug 30 and the other operating key being inclusive of such fourth shut-off position. The two keys will differ, of course, solely by the position of the pin 138.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A by-pass meter bar comprising, in combination, an elongated hollow casting having a first gas supply inlet opening for connection to a gas main, a second gas inlet opening for connection to the outlet of a gas meter, a first gas outlet opening for connection to the inlet of the gas meter, a second gas outlet opening for connection to a service line, and a third gas purge outlet opening in communication with the atmosphere, a valve plug disposed within said casting and movable between a first meter position wherein communication is established between the first gas inlet opening and the first gas outlet opening while at the same time communication is also established between the second gas inlet opening and the second gas outlet opening; a second purge position wherein communication is established between the first gas inlet opening and the first and second gas outlet openings while at the same time communication also is established between the second gas inlet opening and the third gas purge outlet opening, and communication between the second gas inlet opening and the second gas outlet opening is prevented; and a third by-pass position wherein communication is established between the first gas inlet opening and the second gas outlet opening while at the same time communication between the second gas inlet opening and the second gas outlet opening is prevented; and means for selectively moving said valve plug between said positions.

2. A by-pass meter bar as set forth in claim 1 and wherein said valve plug is of the rotatable spool type.

3. A by-pass meter bar comprising, in combination, an elongated hollow casting having a first gas supply inlet opening for connection to a gas main, a second gas inlet opening for connection to the outlet of a gas meter, a first gas outlet opening for connection to the inlet of the gas meter, a second gas outlet opening for connection to a service line, and a third gas purge outlet opening in communication with the atmosphere, a valve plug disposed within said casting and movable between a first meter position wherein communication is established between the first gas inlet opening and the first gas outlet opening while at the same time communication is also established between the second gas inlet opening and the second gas outlet opening; a second purge position wherein communication is established between the first gas inlet opening and the first and second gas outlet openings while at the same time communication also is established between the second gas inlet opening and the third gas purge outlet opening, and communication between the second gas inlet opening and the second gas outlet opening is prevented; a third by-pass position wherein communication is established between the first gas inlet opening and the second gas outlet opening while at the same time communication between the second gas inlet opening and the second gas outlet opening is prevented; and a fourth shut-off position wherein communication between the first gas inlet opening and the other gas openings is prevented; and means for moving said valve plug between said positions.

4. A by-pass meter bar as set forth in claim 3 and wherein said valve plug is of the rotatable spool type.

5. A by-pass meter bar as set forth in claim 3 and wherein said valve plug is of the rotatable spool type, wherein said first gas inlet opening and first gas outlet opening are disposed adjacent one end of the elongated casting, and wherein said second inlet opening and second outlet opening are disposed adjacent the other end of the casting.

6. A by-pass meter bar as set forth in claim 3 and wherein said valve plug is of the rotatable spool type, wherein said first gas inlet opening and said first gas outlet are disposed adjacent one end of the elongated casting, wherein said second inlet opening and second outlet opening are disposed adjacent the other end of the casting, and wherein said valve plug is disposed adjacent one end of the casting.

7. A by-pass meter bar as set forth in claim 6 and wherein said valve plug is disposed adjacent said other end of the casting.

8. A by-pass meter bar for operatively supporting a gas meter, said meter bar comprising, in combination, an elongated horizontally disposed hollow tubular casting defining an internal chamber, said chamber being provided with an axially extending first gas inlet opening at one end, a downwardly facing lateral first gas outlet opening adjacent said end for connection to the inlet of the gas meter, a downwardly facing second lateral inlet opening adjacent the other end of the casting for connection to the outlet of the gas meter, a second upwardly facing gas outlet opening for connection to a service line, and a third downwardly facing gas purge outlet opening in communication with the atmosphere, means establishing a transverse cylindrical valve chamber in said casting and intersecting said internal chamber, said casting being provided with four internal webs including a first web disposed between said first gas inlet and said first outlet opening, a second web disposed between said first inlet opening and said second outlet opening, and a third web disposed between said second outlet opening and said second inlet opening, and a fourth web extending between said second inlet opening and said first outlet opening, said webs converging generally radially inwardly of the casting and toward one another and having their inner ends terminating at the periphery of said valve chamber, a rotary cylindrical valve plug rotatably disposed within said valve chamber and having first and second valve passages therein, said valve plug being rotatable between a first meter position wherein said first valve passage opposes the first web and establishes communication between the first gas inlet and the first gas outlet while the second valve passage opposes the third web and establishes communication between the second gas inlet and the second gas outlet; a second purge position wherein said first valve passage opposes the first and second webs and establishes communication between the first gas inlet opening and the first and second gas outlet openings while the second valve passage opposes positions of the third and fourth webs and establishes communication between the second gas inlet opening and the third gas purge outlet opening; and a third by-pass position wherein the first valve passage opposes the second web and establishes communication between the first gas inlet opening and the second gas outlet opening; and means for rotating said valve plug.

9. A by-pass meter bar for operatively suporting a gas meter, said meter bar comprising, in combination, an elongated horizontally disposed hollow tubular casting defining an internal chamber, said chamber being provided with an axially extending first gas inlet opening at one end, a downwardly facing lateral first gas outlet opening adjacent said end for connection to the inlet of the gas meter, a downwardly facing second lateral inlet opening adjacent the other end of the casting for connection to the outlet of the gas meter, a second upwardly facing gas outlet opening for connection to a service line, and a third downwardly facing gas purge outlet opening in communication with the atmosphere, means establishing a transverse cylindrical valve chamber in said casting and intersecting said internal chamber, said casting being provided with four internal webs including a first web disposed between said first gas inlet and said first outlet opening, a second web disposed between said first inlet opening and said second outlet opening, a third web disposed between said second outlet opening and said second inlet opening, and a fourth web extending between said second inlet opening and said first outlet opening, said webs converging generally radially inwardly of the casting and toward one another and having their inner ends terminating at the periphery of said valve chamber, a rotary cylindrical valve plug rotatably disposed within said valve chamber and having first and second valve passages therein, said valve plug being rotatable between a first meter position wherein said first valve passage opposes the first web and establishes communication between the first gas inlet and the first gas outlet while the second valve passage opposes the third web and establishes communication between the second gas inlet and the second gas outlet; a second purge position wherein said first valve passage opposes the first and second webs and establishes communication between the first gas inlet opening and the first and second gas outlet openings while the second valve passage opposes positions of the third and fourth webs and establishes communication between the second gas inlet opening and the third gas purge outlet opening; a third by-pass position wherein the first valve passage opposes the second web and establishes communication between the first gas inlet opening and the second gas outlet opening; and a fourth shut-off position wherein the two valve passages are out of register with the first gas inlet opening; and means for rotating said valve plug.

10. A by-pass meter bar comprising, in combination, an elongated hollow casting having a first gas supply inlet opening for connection to a gas main, a second gas inlet opening for connection to the outlet of a gas meter, a first gas outlet opeing for connection to the inlet of the gas meter, a second gas outlet opening for connection to a service line, and a third gas purge outlet opening in communication with the atmosphere, a valve plug disposed within said casting and movable between a first meter position wherein communication is established between the first gas inlet opening and the first gas outlet opening while at the same time communication is also established between the second gas inlet opening and the second gas outlet opening; a second purge position wherein communication is established between the first gas inlet opening and the first and second gas outlet openings while at the same time communication also is established between the second gas inlet opening and the third gas purge outlet opening, and communication between the second gas inlet opening and the second gas outlet opening is prevented, and a third by-pass position wherein communication is established between the first gas inlet opening and the second gas outlet opening while at the same time communication between the second gas inlet opening and the second gas outlet opening is prevented; the well of said casting being provided with a test opening therein adjacent the second outlet opening, said test opening being in communication with the second inlet opening when the valve plug is in its first meter position; with the first inlet opening when the valve plug is in its third by-pass position, and with the first inlet opening when the valve plug is in its second purge position, and means for moving said valve plug between said positions.

11. In a rotary spool-type directional valve assembly, in combination, a valve casing having four converging internal webs, each pair of adjacent webs defining therebetween an internal fluid passage leading to a central cylindrical valve chamber from the exterior of the casing, a rotary valve plug disposed within said valve chamber and capable of angular turning movement therein between first, second and third angular positions wherein said fluid passages are variously connected to one another, the wall of said valve casing having a circular opening therein in registry with the valve chamber and through which the end face of the valve plug is accessible for manipulation, a cylindrical key actuator for said valve plug and capable of endwise insertion through said circular opening, interengaging means on the end faces of the key actuator and valve plug respectively for transmitting torque from the key actuator to the valve plug, a circular retaining flange on said key actuator, a locking protruberance adjacent the rim of said circular opening, said circular retaining flange being formed with a peripheral notch therein designed for registry with said locking protuberance to permit endwise insertion of the key actuator into the opening for cooperation of said interengaging means, said retaining flange and locking protuberance effecting sliding interlocking engagement with each other during turning of the key actuator when the latter is disposed within said circular opening and preventing removal of the key actuator from said opening when the locking protruberance and notch are out of register with each other, said locking protuberance and notch being in register with each other when the valve plug is in its first position.

12. In a rotary spool-type directional valve assembly, the combination set forth in claim 11 including, additionally, interengaging means on said valve casing and key actuator in the form of a lost-motion connection effective to prevent turning movement of the key actuator in one direction when the valve plug is in its third position, and to prevent turning movement of the key actuator in the other direction when the valve plug is in its first position.

References Cited by the Applicant
UNITED STATES PATENTS

| | | | |
|---|---|---|---|
| 2,540,229 | 2/1951 | Alessandro | 137—625.29 |
| 2,579,656 | 12/1951 | Douglas et al. | 137—599.1 X |

FOREIGN PATENTS

| | | |
|---|---|---|
| 898,244 | 11/1953 | Germany. |

M. CARY NELSON, *Primary Examiner.*